(12) United States Patent
Haffner et al.

(10) Patent No.: US 10,612,949 B2
(45) Date of Patent: Apr. 7, 2020

(54) PLANT, MEASUREMENT SYSTEM, AND METHOD FOR MEASURING TEMPERATURE AND VELOCITY OF A FLOW OF FLUID

(71) Applicant: General Electric Technology GmbH, Baden (CH)

(72) Inventors: Ken Yves Haffner, Baden (CH); Dominique Heinis, Baden (CH); Pascal Decoussemaeker, Baden (CH)

(73) Assignee: General Electric Technology GmbH, Baden (CH)

( * ) Notice: Subject to any disclaimer, the term of this patent is extended or adjusted under 35 U.S.C. 154(b) by 343 days.

(21) Appl. No.: 15/549,694

(22) PCT Filed: Feb. 10, 2016

(86) PCT No.: PCT/EP2016/052830
§ 371 (c)(1),
(2) Date: Aug. 9, 2017

(87) PCT Pub. No.: WO2016/128467
PCT Pub. Date: Aug. 18, 2016

(65) Prior Publication Data
US 2018/0031401 A1    Feb. 1, 2018

(30) Foreign Application Priority Data
Feb. 11, 2015  (EP) ..................... 15154742

(51) Int. Cl.
*G01F 1/66*   (2006.01)
*G01P 5/24*   (2006.01)
(Continued)

(52) U.S. Cl.
CPC ............. *G01F 1/668* (2013.01); *G01F 1/667* (2013.01); *G01K 11/24* (2013.01); *G01K 13/02* (2013.01);
(Continued)

(58) Field of Classification Search
CPC ....... G01F 1/668; G01F 1/7044; G01K 11/24; G01K 13/02; G01K 2013/024;
(Continued)

(56) References Cited

U.S. PATENT DOCUMENTS 4,162,630 A * 7/1979 Johnson ................. G01P 5/245
                                                    73/861.27
6,601,447 B1   8/2003 Loucks
(Continued)

FOREIGN PATENT DOCUMENTS

CN      1076024 A     9/1993
CN    101339200 A     1/2009
(Continued)

OTHER PUBLICATIONS

Ostashev "Recent Progress in Acoustic Travel-Time Tomography of the Atmospheric Surface layer" (Year: 2009).*

(Continued)

*Primary Examiner* — Regis J Betsch
*Assistant Examiner* — Kaleria Knox
(74) *Attorney, Agent, or Firm* — James Pemrick; Hoffman Warnick LLC

(57) ABSTRACT

A method of measuring temperature and velocity of a fluid flow passing through a device of a plant includes the step of positioning at least two sensors in the device. For each sensor, a traveling path for an acoustic signal received from another sensor is determined. Each sensor emits an acoustic signal at a frequency that differs from a frequency of an acoustic signal to be emitted by the other sensor(s) in the (Continued)

fluid flow. A velocity profile and temperature profile for the fluid flow based on the acoustic signals received by the sensors is determined. A measurement system can include sensors and a computer device that can determine a velocity profile and temperature profile for a fluid flow passing through a device based on the acoustic signals received by the sensors. A plant can be configured to implement the method or include an embodiment of the measurement system.

17 Claims, 4 Drawing Sheets

(51) Int. Cl.
    *G01K 11/24*      (2006.01)
    *G01K 13/02*      (2006.01)

(52) U.S. Cl.
    CPC ........ *G01P 5/245* (2013.01); *G01K 2013/024* (2013.01)

(58) Field of Classification Search
    CPC ........ G01P 5/245; F01C 9/28; F02D 41/1401; F04B 49/00; G10K 11/28
    See application file for complete search history.

(56) References Cited

U.S. PATENT DOCUMENTS

| | | | |
|---|---|---|---|
| 8,565,999 | B2 | 10/2013 | Bunce et al. |
| 2007/0151363 | A1 | 7/2007 | Ramsesh |
| 2010/0050591 | A1 | 3/2010 | Nemet et al. |
| 2012/0150413 | A1* | 6/2012 | Bunce ............... F02C 9/28 701/100 |
| 2013/0047576 | A1* | 2/2013 | Sander ............... F02C 3/34 60/39.182 |
| 2013/0180342 | A1* | 7/2013 | Shen ............... G10K 11/28 73/861.25 |
| 2013/0219986 | A1* | 8/2013 | Laukkanen ........... G01F 1/7044 73/1.24 |
| 2013/0312487 | A1* | 11/2013 | Miyai ............... F04B 49/00 73/23.31 |
| 2014/0144156 | A1 | 5/2014 | Lang et al. |

FOREIGN PATENT DOCUMENTS

| | | | |
|---|---|---|---|
| CN | 201522502 U | 7/2010 | |
| CN | 103850803 A | 6/2014 | |
| JP | 2002-156294 | * 5/2002 | ............ G01K 11/24 |
| JP | 2002-156294 A | 5/2002 | |
| JP | 2006-118921 A | 5/2006 | |

OTHER PUBLICATIONS

Ostashev, V.E., et al., "Random inhomogeneities in a moving random medium," Chapter 6, Acoustics in Moving Inhomogeneous Media, pp. 1-9 (1997).
Ostashev, V.E., et al. "Statistical moments of the sound field in a moving random medium," Chapter 7, Acoustics in Moving Inhomogeneous Media, pp. 1-29 (1997).
Ostashev, V.E., et al., "Recent Progress in Acoustic Travel-Time Tomography of the Atmospheric Surface Layer," Meteorologische Zeitschrift, vol. 18, No. 2, pp. 1-10 (Apr. 2009).
Vecherin, S.N., et al., "Time-dependent stochastic inversion in acoustic travel-time tomography of the atmosphere," Acoustical Society of America, vol. 119, Issue 5, pp. 2579-2588 (May 2006).
Vecherin, S.N., et al., "Tomographic reconstruction of atmospheric turbulence with the use of time-dependent stochastic inversion," Acoustical Society of America, vol. 122, Issue 3, pp. 1-11 (Sep. 2007).
Vecherin, S.N., et al., "Time-dependent stochastic inversion in acoustic tomography of the atmosphere with reciprocal sound transmission," IOP Publishing, Measurement science and technology, vol. 19, pp. 1-12 (2008).
Vecherin, S.N., et al., "Three-Dimensional Acoustic Travel-Time Tomography of the Atmosphere," Acta acustica united with acustica, vol. 94, pp. 349-358 (2008).
Extended European Search Report and Opinion issued in connection with corresponding EP Application No. 15154742.9 dated Jul. 20, 2015.
International Search Report and Written Opinion issued in connection with corresponding PCT Application No. PCT/EP2016/052830 dated Apr. 20, 2016.
Office Action issued in connection with corresponding EP Application No. 15154742.9 dated Feb. 2, 2018.
CN Patent Application No. 2016800100628, Search Report dated Feb. 25, 2019, 1 page.
CN Patent Application No. 2016800100628, Office Action dated Mar. 5, 2019, 15 pages.
CN Patent Application No. 2016800100628, Office Action dated Sep. 20, 2019, 10 pages.

* cited by examiner

PLANT, MEASUREMENT SYSTEM, AND METHOD FOR MEASURING TEMPERATURE AND VELOCITY OF A FLOW OF FLUID

FIELD OF INVENTION

The present innovation is related to apparatuses configured to detect and detect and/or measure temperature and velocity of a flow of fluid, a plant having such at least one such apparatus, and methods of making and using the same.

BACKGROUND OF THE INVENTION

U.S. Patent Application Publication No. 2012/0150413 discloses a method by which a temperature of a gas flow of a gas turbine can be measured. Other examples of mechanisms and methods used to measure temperature of a gas flow for a plant can be appreciated from U.S. Patent Application Publication Nos. 2014/0144156, 2013/0047576, and 2010/0050591. Measurement systems utilized to identify the temperature of a gas can fail to provide other information about the gas being measured. Such systems can also fail to provide information that can be utilized for identifying a need for scheduling preventive maintenance.

BRIEF DESCRIPTION OF THE INVENTION

According to aspects illustrated herein, a method of measuring temperature and velocity of a fluid flow passing through a device of a plant includes the step of positioning at least two sensors in the device. For each sensor, a traveling path for the acoustic signal received from the other sensor(s) can be determined. Each sensor can emit, into the fluid flow, an acoustic signal at a frequency that differs from a frequency of an acoustic signal to be emitted by the other sensor. A velocity profile and temperature profile for the fluid flow can also be determined based on the acoustic signals received by the sensors.

According to other aspects illustrated herein, a measurement system for a device of a plant can include an array of sensors and a computer device. The array of sensors can be configured to detect a temperature and a velocity of a fluid that will pass through a device. Each of the sensors can be configured to emit an acoustic signal at a frequency that differs from the frequency of the acoustic signals to be emitted by the other one or more sensors of the array of sensors. Each of the sensors can also be configured to receive an acoustic signal emitted by at least one of the other one or more sensors. The computer device can have hardware that includes at least one processor that is communicatively connected to non-transitory memory. The computer device can be configured to be communicatively connectable to the sensors to determine a velocity profile and temperature profile of the fluid that will pass through the device based on the data to be received from the sensors. The data to be received from each of the sensors can be based on each acoustic signal received by that sensor.

According to other aspects illustrated herein, a plant can include a device, an array of sensors and a computer device. The device can be a combustion device, a boiler, a furnace, a gas turbine, a heat recovery steam generator, or a heat exchanger. The array of sensors can be positioned in the device to detect a temperature and velocity of a fluid passing through the device during operation of the device. Each of the sensors can be configured to emit an acoustic signal at a frequency that differs from a frequency of the acoustic signal to be emitted by the one or more other sensors. Each of the sensors can also be configured to receive the acoustic signal emitted by at least one of the other one or more sensors. The computer device can have hardware including at least one processor that is communicatively connected to non transitory memory. The computer device can be configured to be communicatively connectable to the sensors to determine a velocity profile and temperature profile of a flow of the fluid passing through the device based on the data to be received from the sensors. The data to be received from each of the sensors can be based on each acoustic signal received by that sensor. The determining of the velocity profile and the temperature profile to be made by the computer device can account for traveling paths of the acoustic signals received by the sensors and account for differences between travel times of the acoustic signals and expected travel times for the acoustic signals based on theoretical correlations between temperature and speed fluctuations of the fluid. Changes in the travel times can be determined by calculations in which velocity spatial averages for the flow of the fluid are determined by the computer device. Local fluctuations to the velocity spatial averages as compared to the determined velocity spatial averages can be determined by the qcomputer device. The travel times for the acoustic signals can be determined by subtracting the determined local fluctuations from the velocity spatial averages. The velocity spatial averages for the flow of fluid can be determined based on:

$$\frac{L_i}{c_0(t)}\left(1 - \frac{U_0(t)\cos(\varphi_i) + V_0(t)\sin(\varphi_i)}{c_0(t)}\right)$$

where i is an iteration step, t is time, L is a length of the traveling path for the acoustic signal, $c_0$ is spatial average of sonic speed, $U_0$ is an average velocity component of the fluid in a direction along a defined x-axis, $V_0$ is an average velocity component of the fluid in a direction along a defined y-axis, and $\varphi$ is an angle of sound propagation to the defined x-axis. The determination of local fluctuations to the velocity spatial averages can be based on:

$$\frac{1}{c_0^2(t)}\int_{L_i}\left[\frac{c_0(t)}{2T_0(t)}\Delta T(R, t) + \Delta U(R, t)\cos(\varphi_i) + \Delta V(R, t)\sin(\varphi_i)\right]$$

where $T_0$ is spatial average of temperature, $\Delta T$ is a local fluctuation of temperature, $\Delta U$ is a fluctuation of fluid velocity along the defined x-axis, $\Delta V$ is a fluctuation of fluid velocity along the defined y-axis, and R is a position in the device through which the fluid passes.

The above described and other features are exemplified by the following figures and detailed description.

BRIEF DESCRIPTION OF THE DRAWINGS

Exemplary embodiments of an apparatus, a plant, and associated exemplary methods are shown in the accompanying drawings. It should be understood that like reference numbers used in the drawings may identify like components, wherein.

Figure 1:
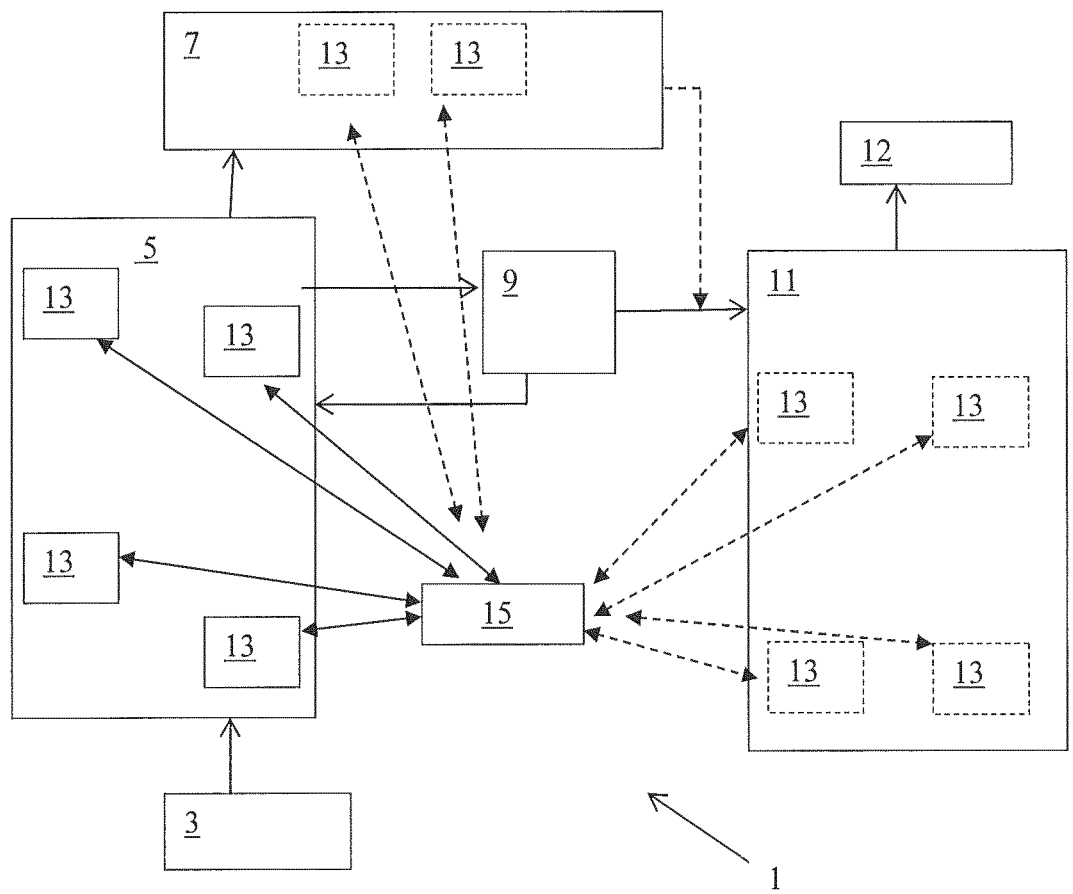
FIG. 1 is a block diagram of a first exemplary embodiment of a plant.

Other details, objects, and advantages of embodiments of the innovations disclosed herein will become apparent from the following description of exemplary embodiments and associated exemplary methods.

DETAILED DESCRIPTION OF THE INVENTION

Referring to FIGS. 1-5, a plant 1 can be configured as an industrial plant, a power plant, or other type of plant. In some embodiments, the plant 1 can be configured to generate electricity. The plant 1 can include a source of fuel 3, such as a coal mill or a storage tank that retains a fuel such as oil or natural gas that feeds fuel to a combustion apparatus 5 via a feed conduit connected between the source of fuel 3 and the combustion apparatus 5. The fuel fed to the combustion apparatus 5 can be a fossil fuel or may be another type of fuel.

The combustion apparatus 5 can be configured as a device such as a boiler, a furnace, a combustor, or other type of combustion device that is configured to combust fuel in a combustion chamber defined within a vessel of the combustion apparatus 5. The combustion apparatus can be configured to utilize one or more burners in one or more combustion zones defined within the combustion chamber for combustion of the fuel. The combustion apparatus may also receive air or other oxidant flow for use in the combustion of the fuel.

The combustion of the fuel in the combustion apparatus may form a hot flue gas. The heat from the flue gas can be transferred to water, steam, or other fluid via one or more heat exchangers within an outlet conduit of the combustion apparatus 5 for heating that fluid prior to that fluid being fed to at least one gas turbine 7 of a generation unit. In some embodiments, the gas turbine 7 of the generation unit can connected to a generator that is configured to generate electricity.

Flue gas formed from the combustion of the fuel may be output from the combustion apparatus 5 and fed to a gas processing unit 9 via a gas processing unit feed conduit connected between the gas processing unit 9 and the combustion apparatus 5. The gas processing unit 9 can include a precipitator, a bag house, a desulfurization unit, a carbon capture system and/or other gas processing mechanisms for removing pollutants and/or particulates from the flue gas. A portion of the flue gas that is processed by the gas processing unit 9 can be recycled back to the combustion apparatus via at least one recycle conduit connected between the gas processing unit 9 and the combustion apparatus 5. Another portion of the flue gas may be output from the gas processing unit 9 and fed to another device such as a stack or heat recovery steam generator (HRSG) 11 via a gas processing unit output conduit connected between the gas processing unit 9 and the HRSG 11. Alternatively, gas from the turbine 7 may be provided to the HRSG 11, as shown by the dashed line therebetween.

The flue gas can pass through the HRSG 11 so that heat from the flue gas can be transferred to water or other fluid via heat exchangers connected to the HRSG (e.g. evaporators, etc.). The flue gas may be output from the HRSG to be emitted to the atmosphere external to the plant 1 via a stack 12 or chimney that can be connected to the HRSG 11 for receiving the flue gas for emitting to the atmosphere.

The plant 1 can also include a measurement system that includes at least one array of sensors 13 and a computer device 15 that is communicatively connected to the sensors 13. Each of the sensors 13 may include hardware that includes at least one acoustic signal emitter and at least one acoustic signal receiver. For example, as may be appreciated from FIG. 3, each sensor 13 can include a processor 24 that is communicatively connected to non-transitory memory 23, a transmitter unit 21 and a receiver unit 22. The processor 24 can be a central processing unit, a microprocessor, a core processor, or other type of hardware processor device. The non-transitory memory can be flash memory or other type of computer readable medium. The transmitter unit 21 and receiver unit 22 can be parts of a transceiver unit of the sensor 13. In some embodiments, the transmitter unit 21 can include an emitter or a tweeter that is configured to emit acoustic signals into a flow of fluid passing through the combustion apparatus. Each sensor 13 can be configured to emit an acoustic signal that is at a frequency that is unique to that sensor 13 so that each of the sensors emits an acoustic signal at a frequency that differs from the frequency of all the other sensors 13 within an array of sensors of the measurement system. The transmitter unit 21 can also include a transmitter that is configured to send data from the acoustic signals received by the receiver unit 22 to the computer device 15 via a communication path that may include a wireless transmission path and/or a wired transmission path. For instance, the transmitter unit 21 can also include a transmitter that provides data to the computer device 15 via a wireless network connection, a wired network connection, or other type of network connection. As another example, the transmitter unit 21 can be configured to send data to the computer device 15 via a direct wired communication link extending between the computer device 15 and the sensor 13 or via a direct wireless communication link extending between the sensor 13 and the computer device 15.

Figure 4:
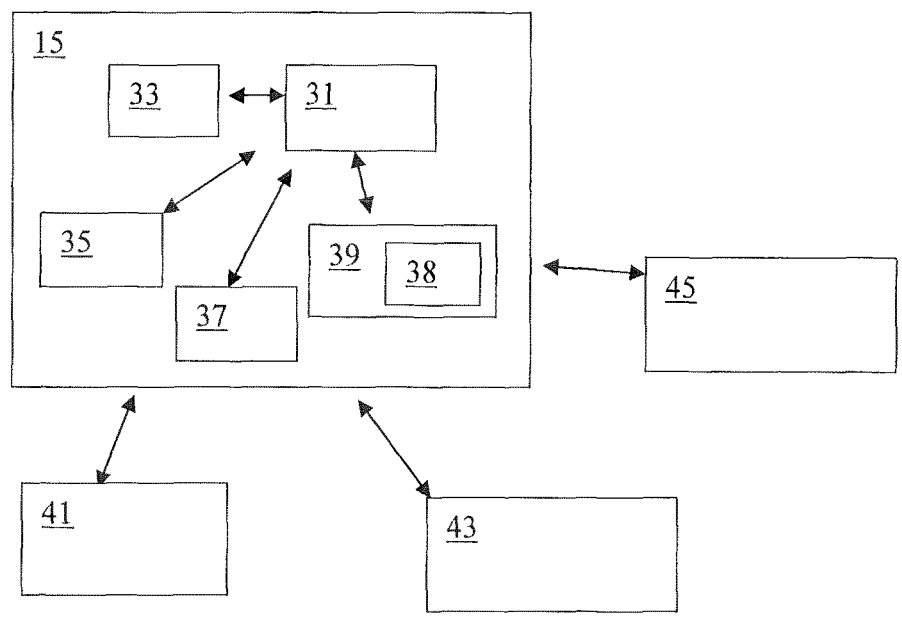
FIG. 4 is a block diagram of an exemplary embodiment of a computer device of the first exemplary embodiment of the plant.
Figure 5:
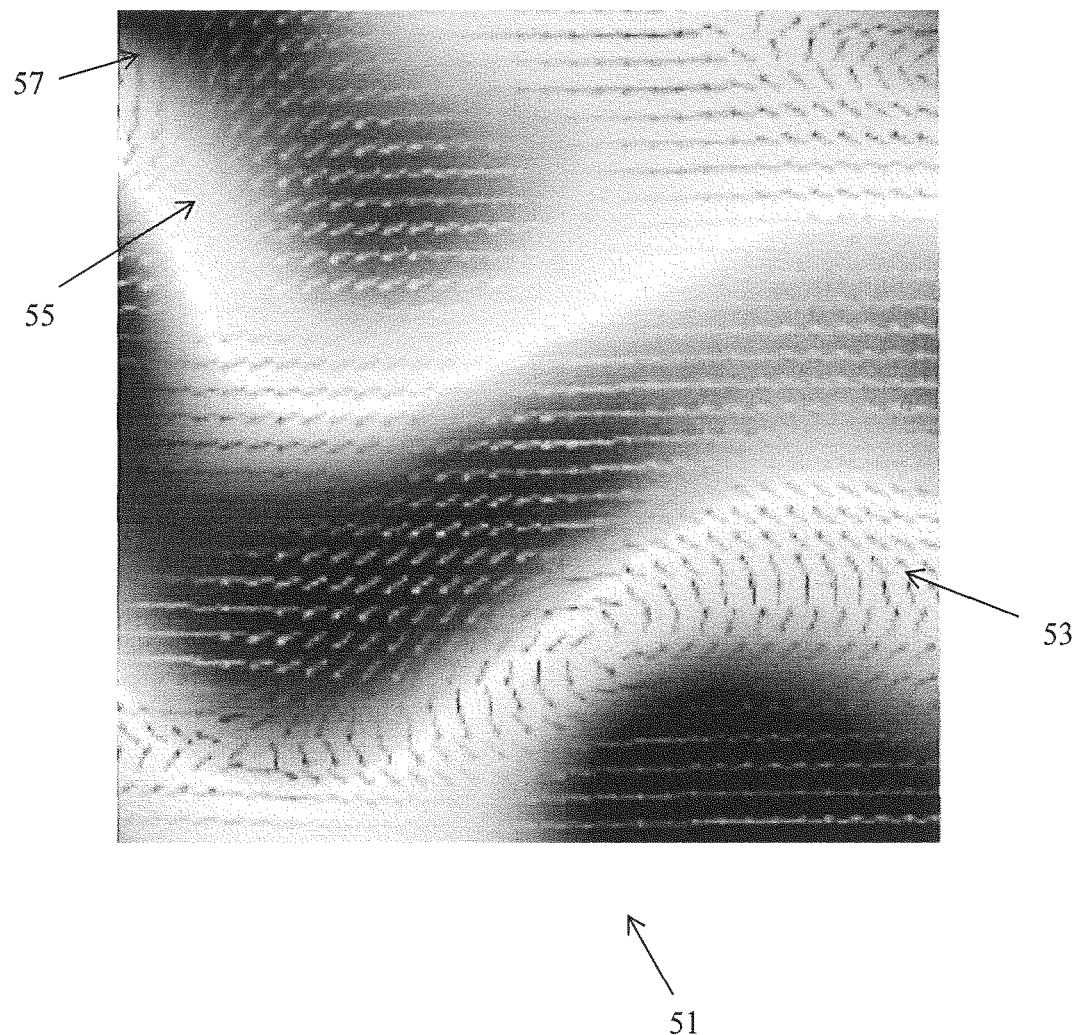
FIG. 5 illustrates an exemplary display of a temperature profile and velocity profile of a fluid flow that can be generated by the computer device of the first exemplary embodiment of the plant.

As can be seen from FIG. 4, the computer device 15 can include hardware, such as a processor 31 that is communicatively connected to non-transitory memory 39, a transmitter unit 37, a receiver unit 35, and at least one input device 33. The input device 33 can include, for example, a keyboard, a mouse, a button, or other input device that can permit a user to provide input to the computer device 15. The non-transitory memory can include a flash memory, a hard drive, or other type of computer readable medium. The memory 39 can store one or more programs 38 that can be executed by the processor 31 to cause the computer device 15 to perform a particular method. For instance, the program may be defined by code that defines a method that is performed by the computer device 15 when the processor 31 of the computer device 15 executes the program. The transmitter unit 37 and receiver unit 35 can each be parts of a transceiver unit. The receiver unit 35 can be configured to receive data transmitted from the sensors 13 to the computer device 15. The transmitter unit 37 can be configured to transmit data to the sensors 13 and can also be configured to transmit data to other devices.

The computer device 15 can also be connected to one or more peripheral devices, which can include at least one input device and at least one output device. For instance, a display device 41 and a printer 43 can each be communicatively connected to the computer device 15 so that data can be displayed via the display device 41 or printed via the printer 43. The display device 41 can be configured as a liquid crystal display, a computer monitor, or other type of display. In some embodiments, the display device 41 can be configured as a touch screen so that the display device and also provide input to the computer device based on a user manipulating the screen of the display device 41. The computer device 15 can also be connected to at least one acoustic device 45, such as a microphone that can be configured to provide acoustic input provided by a user to the computer device 15 or a speaker that can be configured to output acoustic data received from the computer device 15 to the user of the computer device 15.

In some embodiments, a first array of sensors 13 can be positioned in the combustion apparatus 5 to emit acoustic signals into a flow of fluid (e.g. flue gas or fuel mixed with gas). At least one second array of sensors 13 can also be positioned in another device such as the HRSG 11 and/or a gas turbine 7 as indicated in broken line in FIG. 1 to emit acoustic signals into a flow of fluid such as a flow of gas. In yet other embodiments, the sensors 13 may only be positioned in the HRSG 11 or may only be positioned in the gas turbine 7 or may only be positioned in the HRSG 11 and a gas turbine 7. In yet other embodiments the sensors may be positioned in another device (e.g. a heat exchanger) for use in determining the temperature profile and velocity profile of a fluid such as a liquid or a gas that can pass through a conduit or chamber of that device.

Figure 2:
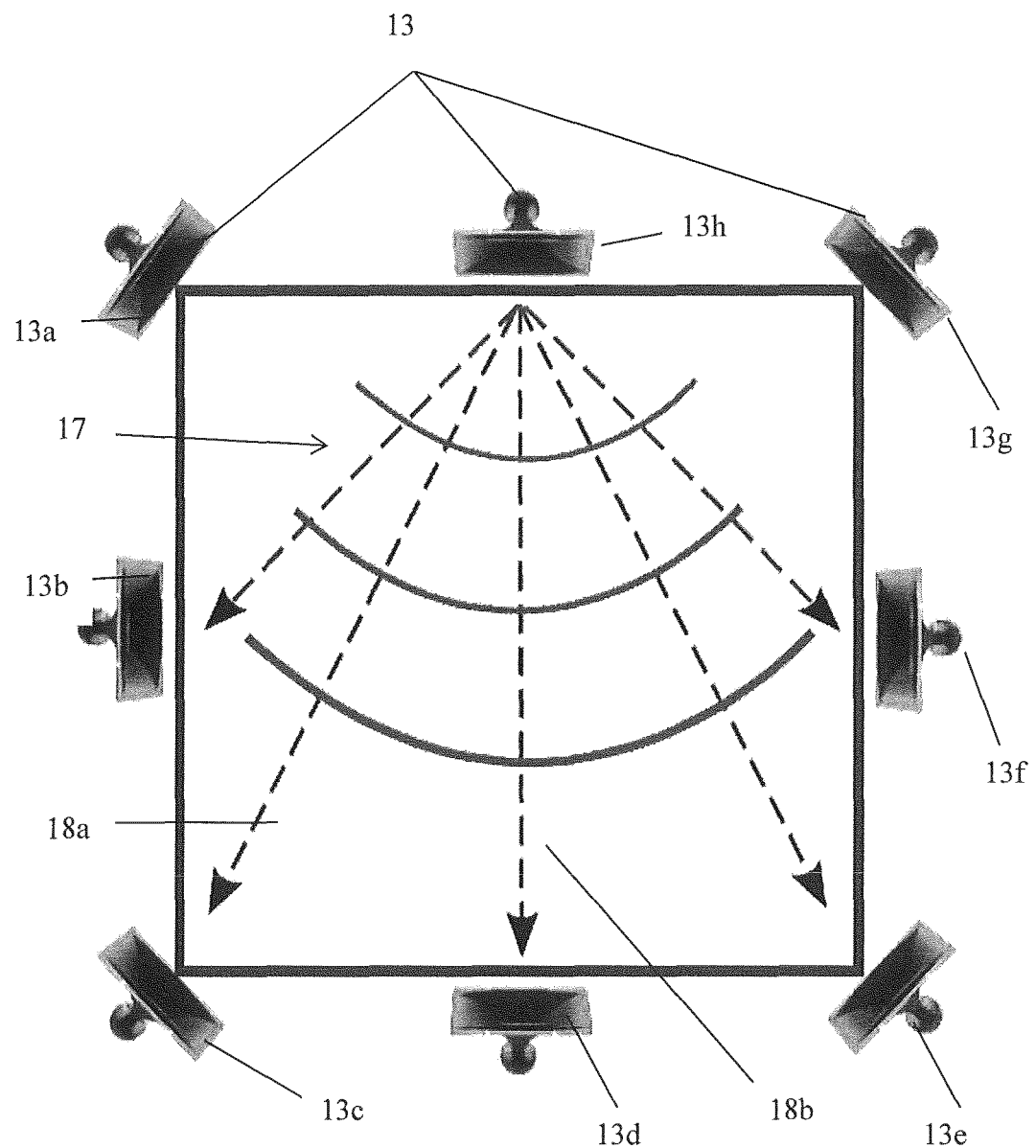
FIG. 2 is a schematic diagram illustrating an exemplary array of sensors that can be included in the first exemplary embodiment of the plant.
Figure 3:
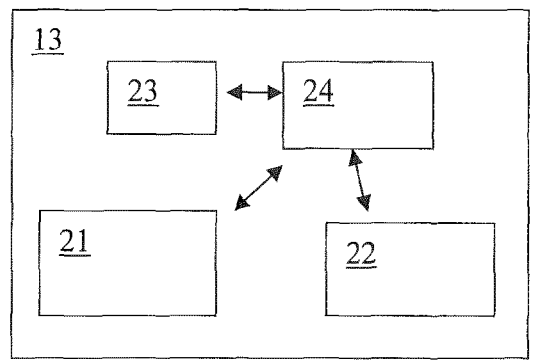
FIG. 3 is a block diagram of an exemplary embodiment of a sensor of the first exemplary embodiment of the plant.

An array of the sensors 13 positioned in a device (e.g. combustion apparatus 5, HRSG 11, gas turbine 7, or a heat exchanger) can include an array of spaced apart sensors 13 as shown in FIG. 2. In some embodiments, the array of sensors 13 can be spaced apart from each other along a perimeter of the device or along a perimeter of a conduit of the device through which a fluid flows. The sensors can be spaced apart from each other such that some of the sensors are at a different elevation than other sensors 13. In one embodiment, the array of sensors 13, can include a first sensor 13a positioned in a first corner of a chamber or conduit of a device, a second sensor 13b positioned between the first sensor and a third sensor 13c that is located in another corner of the chamber or conduit of the device. A fourth sensor 13d can be positioned between the third sensor 13c and a fifth sensor 13e located in another corner of the chamber or conduit of the device. A sixth sensor can be located between the fifth sensor and a seventh sensor 13g located in another corner of the chamber or conduit of the device. An eighth sensor 13h can be located between the seventh sensor 13g and the first sensor 13a. Some embodiments of the measurement system may utilize less than eight sensors and other embodiments may utilize more than eight sensors. For instance, some embodiments can utilize at least two sensors 13, at least four sensors 13, at least six sensors 13 or at least ten sensors.

Each sensor 13 can emit an acoustic signal 17 at a unique frequency for emitting into a flow of fluid that passes through the chamber or conduit of the device such that all of the other sensors can receive the acoustic signal emitted by that sensor or so that some of the other sensors can receive that emitted acoustic signal. The acoustic signal emitted by each sensor can travel along a traveling path, or a transmission path, that extends from the emitting sensor to the receiving sensor. The traveling paths can differ in length for different sensors due to the positioning of the sensors. For instance an acoustic signal 17 emitted by the eighth sensor 13h may extend along a first traveling path 18a that extends over a first distance to be received by the third sensor 13c and may travel along a second traveling path 18b that extends over a second distance for receipt by the fourth sensor 13d. The first traveling path 18a can be longer or shorter than the second traveling path 18b. Also, the traveling time that passes between when the acoustic signal is emitted by the emitting sensor to the time it is received by the receiving sensor (e.g. the time of flight) may also differ for different ones of the receiving sensors.

Each of the sensors 13 can be configured to receive the acoustic signals emitted by at least one other sensor of the array of sensors and transmit those received signals or other data based on those received signals to the computer device 15. The computer device 15 can then utilize that data received from all of the sensors 13 of the array of sensors to determine a two dimensional temperature profile of the fluid and a two dimensional velocity profile of the fluid flow passing through the chamber or conduit of the device. In some embodiments, the computer device can be configured to utilize the data from the sensors to evaluate the temperature and velocity of the fluid along a third dimension to determine a three dimensional temperature profile of the fluid and a three dimensional velocity profile of the fluid flow passing through the chamber or conduit of the device.

The computer device 15 can also be configured to generate data that can be sent to a display device or a printer for generation of a display 51 that illustrates the temperature profile and velocity profile of the fluid flow. One example of such a generated display 51 can be seen in FIG. 5. The displayed temperature profile and velocity profile can include first velocity indicia 53 that identify determined vector velocities of the fluid in at least two dimensions (e.g. horizontal and vertical directions, depth and width directions, height and length directions, longitudinal and lateral directions, etc.) at different locations within the chamber or conduit. The velocity indicia may include arrows, for example, that identify a profile of the velocity of the fluid. The arrows can point in different direction to identify a swirling that may exist within the fluid flow or to identify other variances of the fluid flow to indicate the non-uniform fluid flow profile of the fluid. The display 51 can also include different colored sections 55 and 57 to indicate higher and lower local temperatures within the fluid flow. For instance, lighter colored sections 55 can identify regions within the fluid flow that are of a higher temperature than darker colored sections 57. In other embodiments, the colored sections of the display could range from blue to red and include other colored sections such as green and yellow sections to indicate regions within the fluid flow that are determined to have different temperatures. The different colors can each correspond to temperatures defined within a key to indicate the temperature ranges being indicated by such colors (e.g the color red indicating a range of 350° C.-400° C., the color orange indicating a range of 325° C.-350° C., the color yellow indicating a range of 300° C.-325° C., the color green indicating a range of 275° C.-300° C., the color blue indicating a range of 250° C.-275° C. and the color purple indicating a range of 225° C.-250° C.).

The temperature profile and velocity profile of the fluid flow that is determined to exist based on the data from the sensors can be utilized to identify issues that can require maintenance or other actions to rectify those issues or prevent those issues from damaging or wearing components of the device more quickly than expected to extend the life of the device. For example, the temperature profile and velocity profile of a fluid flow passing through the HRSG 11 can be used to optimize the velocity flow of the fluid to decrease salt deposition on a heat exchanger of the HRSG 11. The velocity profile can also be used to identify a salt deposition on a heat exchanger blocking an air passage so that a cleaning service can be scheduled for cleaning that salt deposition to rectify that issue. The temperature profile of the fluid flow can also be used to determine hot spots at duct burners that may cause thermal stress on tubes of a heat exchanger of the HRSG. The temperature profile of the fluid flow can be used to identify such hot spots so that actions can be taken to minimize thermal stresses that may be caused by such hot spots and/or alter the operation of the duct burners to address the formation of such hot spots.

As another example, the determined velocity profile and temperature profile of the fluid flow can detect fluid leaks that may exist in the HRSG 11 or other device. The detected leaks can then be sealed to prevent further leakage of the fluid.

As yet another example, when sensors 13 are positioned in a boiler, furnace, or other combustion apparatus 5, the temperature profile and velocity profile can be used to detect hot spots locally created inside the combustion apparatus due to a misalignment of the burners. The detected temperature and velocity profiles can be utilized to adjust the operations of the burners to regulate operation of each burner by controlling the amounts of fuel fed to each burner to avoid such hot spots from occurring.

The temperature and velocity profile of the fluid can also be used to control operations of the plant 1 or a device of the plant. For instance, the temperature profile and velocity profile can be used to control the exhaust temperature of a gas turbine to control the performance of the gas turbine 7. The use of acoustic sensors 13 can provide temperature detection and flow velocity profile detection at a much lower cost than temperature probes and pressure and temperature Rake measurement devices that are conventionally used to obtain fluid flow data from the exhaust of a turbine. As another example, the temperature profile and velocity flow of the fluid flow can be utilized to measure the air mass flow being fed into a gas turbine (e.g. the air intake into the gas turbine), which can be utilized for assessing performance of the gas turbine and also be utilized to control operations of the gas turbine. In some embodiments, the calculated air mass flow can be measured for accurate performance calculations in real-time by an embodiment of the measurement system so that operations of the gas turbine can be more quickly and efficiently adjusted.

The computer device 15 can be configured to determine the temperature profile and velocity profile of a fluid flow by a program 38 stored in its memory 39 being executed by the processor 31 of the computer device 15. In some embodiments, the program 38 can be Scilab, which is offered by Scilab Enterprises, that includes specific coding for determining the temperature profile and velocity profile of the fluid flow based on the data obtained from the acoustic signals that have been passed through the flow of fluid and received by the sensors 13. In other embodiments, the program 38 can be defined by code in accordance with Matlab, which is offered by the Math Works, Inc., or Python, which is offered by the Python Software Foundation, that includes specific coding for determining the temperature profile and velocity profile of the fluid flow based on the data obtained from the acoustic signals that have been passed through the flow of fluid and received by the sensors 13.

The program 38 may have code that defines instructions that are executed by the processor 31 to perform a method for determining the temperature and velocity profiles of the fluid flow. The method can include the step of accounting for the traveling path of each acoustic signal received by each sensor and also accounting for a difference between the measured travel time and an expected travel time for each acoustic signal. The expected travel time can be based on a theoretical correlation between temperature and speed fluctuations of the fluid flow. A Time-Dependent Stochastic Inversion method can be utilized to account for differences between the measured travel time and the expected travel time for each acoustic signal.

The accounting for a difference between a measured travel time and an expected travel time for each acoustic signal can be based on a theoretical correlation between temperature and speed fluctuations of the fluid flow. Such an accounting can be provided by consecutively calculating (i) a spatial average of fluid velocity at each instant for a number of instants, (ii) error variances at each instant, and (iii) spatial fluctuations using information of consecutive instants. The measured traveling time between emitters and receptors for the acoustic signals at one instance can be utilized to determine the spatial average and error variances at each instant. The measured traveling time between the emitting sensors and receiver sensors over consecutive instants and the theoretical correlations between temperature and speed fluctuations in time and space can be needed to determine the spatial fluctuations. The theoretical correlations between temperature and speed fluctuations in time and space can be based on Taylor's Locally Frozen Turbulence hypothesis, which assumes that at any given instant turbulence can be assumed to be frozen. For instance, for any variable $\zeta$ that can be used to study turbulence, then the total derivative is equal to zero, i.e., $d\zeta/dt=0$, if it is "frozen".

A change in the travel time can be based on use of the below formula:

$$\Delta t_{(t)} = \frac{L}{c_0(t)} \left( 1 - \frac{\vec{v}_0(t) \cdot \vec{l}}{c_0(t)} \right) + \frac{1}{c_0^2(t)} \int_L \left( \frac{c_0(t)}{2T_0(t)} \Delta T(R, t) + \Delta \vec{v}(R, t) \cdot \vec{l} \right)$$

where t is time; L is a length of the traveling path for the acoustic signal, $c_0(t)$ is spatial average of sonic speed, $T_0(t)$ is spatial average of temperature, $v_0(t)$ is spatial average of a speed vector of the fluid, $\Delta T$ is a local fluctuation of temperature, $\Delta v$ is a local fluctuation of a speed vector of the fluid, l is a unit vector, and R is a position in the device through which the fluid passes. The use of this formula can be bounded by the locations of the walls corresponding to the defined passageway through which the fluid flow passes.

A change in travel time for an acoustic signal that is received from a sensor can be determined by the computer device 15 calculating velocity spatial averages for the fluid, comparing local fluctuations to the velocity spatial averages to the determined velocity spatial averages, and determining each travel time by subtracting the determined local fluctuations from the velocity spatial averages. The two dimensional velocity spatial averages for fluid flow can be determined based on the formula:

$$\frac{L_i}{c_0(t)} \left( 1 - \frac{U_0(t)\cos(\varphi_i) + V_0(t)\sin(\varphi_i)}{c_0(t)} \right)$$

where i is an iteration step, t is time, L is a length of a traveling path for an acoustic signal, $c_0$ is spatial average of sonic speed, $U_0$ is an average velocity component of the fluid in a direction along a defined x-axis, $V_0$ is an average velocity component of the fluid in a direction along a defined y-axis, and $\varphi$ is an angle of sound propagation relative to the defined x-axis. The use of this formula can be bounded by the locations of the walls corresponding to the defined passageway through which the fluid flow passes.

The determining of local fluctuations to the two dimensional velocity spatial averages can be based on the formula:

$$\frac{1}{c_0^2(t)} \int_{L_i} \left[ \frac{c_0(t)}{2T_0(t)} \Delta T(R, t) + \Delta U(R, t)\cos(\varphi_i) + \Delta V(R, t)\sin(\varphi_i) \right]$$

where: t is time, L is a length of a traveling path for an acoustic signal, $c_0$ is spatial average of sonic speed, $T_0$ is a spatial average of temperature, $\Delta T$ is a local fluctuation of temperature, $\Delta U$ is a fluctuation of fluid velocity along the defined x-axis, $\Delta V$ is a fluctuation of fluid velocity along the defined y-axis; $\varphi$ is an angle of sound propagation relative to the defined x-axis, and R is a position in the device through which the fluid passes. The use of this formula can be bounded by the locations of the walls corresponding to the defined passageway through which the fluid flow passes.

In some embodiments, the measurement system can be configured to determine a velocity profile and a temperature profile of a fluid in three dimensions. For such an analysis, a third dimensional component can be incorporated into the calculations for determining velocity spatial averages, local fluctuations to the two dimensional velocity spatial averages, and change in the travel time to account for this third dimension. For such embodiments, the third dimensional component may be defined to account for a defined z-axis that is transverse to the defined x-axis and is also transverse to the defined y-axis (e.g. the defined z-axis is perpendicular to the x-axis and is also perpendicular to the y-axis).

Different embodiments of the plant, measurement system, and method of making and using the same can have different configurations to meet different sets of design criteria. For instance, each sensor 13 can include a receiver unit and a transmitter unit that are housed within separate housings and positioned near each other or each sensor 13 can include at least one transceiver unit within the same housing. As another example, the size of the plant and the type of the plant can be any size or type to meet a particular set of design criteria. As another example, the computer device 15 can be configured as a desktop computer, a personal computer, a work station, a controller, a server computer device, or other type of computer device. As yet another example, the fluid being measured by the measurement system can be a gas, a liquid, a gas mixed with solid particulates (e.g. fly ash), or a combination of a gas and a liquid.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of measuring temperature and velocity of a fluid flow passing through a device of a plant, the method comprising:
   positioning at least two sensors in the device;
   for each sensor, determining a traveling path for the acoustic signal received from the other sensor;
   each sensor emitting, into the fluid flow, an acoustic signal at a frequency that differs from a frequency of an acoustic signal to be emitted by the other sensor; and
   determining a velocity profile and temperature profile for the fluid flow based on the acoustic signals received by the sensors, the determining including:
      accounting for the traveling path of each acoustic signal received by each sensor and for a difference between a measured travel time and an expected travel time for each acoustic signal based on a theoretical correlation between temperature and speed fluctuations of the fluid flow,
   wherein the accounting for the difference between the measured travel time and the expected travel time for each acoustic signal based on the theoretical correlation between temperature and speed fluctuations of the fluid flow includes consecutively calculating:
      (i) a spatial average of fluid velocity at each instant for a number of instants;
      (ii) error variances at each instant; and
      (iii) spatial fluctuations using information of consecutive instants.

2. The method of claim 1, wherein each sensor comprises:
   an acoustic transceiver having a receiver unit and a transmitter unit.

3. The method of claim 1, wherein each sensor comprises:
   a tweeter and a receiver.

4. The method of claim 1, comprising:
   applying a Time-Dependent Stochastic Inversion method to account for differences between the measured travel time and the expected travel time for each acoustic signal.

5. The method of claim 1, comprising:
   determining, based on at least one of the determined temperature profile and the determined velocity profile, that the device requires maintenance to address at least one of: a blockage to the fluid flow, a hot spot, and a leakage of fluid; and wherein the fluid is a gas or a liquid.

6. The method of claim 1, wherein a change in the travel time is determined based on:

$$\Delta t_{(t)} = \frac{L}{c_0(t)} \left( 1 - \frac{\vec{v}_0(t) \cdot \vec{l}}{c_0(t)} \right) + \frac{1}{c_0^2(t)} \int_L \left( \frac{c_0(t)}{2T_0(t)} \Delta T(R, t) + \Delta \vec{v}(R, t) \cdot \vec{l} \right)$$

where:
   t is time;
   L is a length of the traveling path for the acoustic signal;
   $c_0$ (t) is spatial average of sonic speed;
   $T_0$ (t) is spatial average of temperature;
   $v_0$ (t) is spatial average of a speed vector of the fluid;
   $\Delta T$ is a local fluctuation of temperature;
   $\Delta v$ is a local fluctuation of a speed vector of the fluid;
   l is a unit vector; and
   R is a position in the device through which the fluid passes.

7. The method of claim 1, wherein determining a change in travel time comprises:
   calculating velocity spatial averages for the fluid;
   comparing local fluctuations to the velocity spatial averages to the determined velocity spatial averages; and
   determining each travel time by subtracting the determined local fluctuations from the velocity spatial averages.

8. The method of claim 7, wherein the velocity spatial averages for fluid flow are determined based on:

$$\frac{L_i}{c_0(t)}\left(1 - \frac{U_0(t)\cos(\varphi_i) + V_0(t)\sin(\varphi_i)}{c_0(t)}\right)$$

where:
   i is an iteration step;
   t is time;
   L is a length of a traveling path for an acoustic signal;
   $c_0$ is spatial average of sonic speed;
   $U_0$ is an average velocity component of the fluid in a direction along a defined x-axis;
   $V_0$ is an average velocity component of the fluid in a direction along a defined y-axis; and
   $\varphi$ is an angle of the sound propagation relative to the defined x-axis.

9. The method of claim 8, wherein the determining of local fluctuations to the velocity spatial averages is based on:

$$\frac{1}{c_0^2(t)}\int_{L_i}\left[\frac{c_0(t)}{2T_0(t)}\Delta T(R, t) + \Delta U(R, t)\cos(\varphi_i) + \Delta V(R, t)\sin(\varphi_i)\right]$$

where:
   $T_0$ is a spatial average of temperature;
   $\Delta T$ is a local fluctuation of temperature;
   $\Delta U$ is a fluctuation of fluid velocity along the defined x-axis;
   $\Delta V$ is a fluctuation of fluid velocity along the defined y-axis; and
   R is a position in the device through which the fluid passes.

10. The method of claim 9, comprising:
   evaluating a third dimension of the fluid flow to determine the travel time.

11. The method of claim 9, comprising:
   generating a display of the determined temperature profile and the determined velocity profile of the fluid flow in at least two dimensions.

12. The method of claim 1, wherein the device is a combustor, a boiler, a furnace, a gas turbine, a heat recovery steam generator, or a heat exchanger.

13. The method of claim 12, wherein the temperature profile is a two dimensional temperature profile and the velocity profile is a two dimensional velocity profile.

14. The method of claim 12, comprising:
   determining, based on at least one of the determined temperature profile and the determined velocity profile, that the device is experiencing at least one of: a blockage to the flow of the fluid, a hot spot, and a fluid leak.

15. A measurement system for a device of a plant, comprising:
   an array of sensors configured to detect a temperature and a velocity of a fluid that will pass through a device, each of the sensors being configured to emit an acoustic signal at a frequency that differs from a frequency of an acoustic signals to be emitted by the other one or more sensors of the array of sensors, each of the sensors also being configured to receive an acoustic signal emitted by at least one of the other one or more sensors;
   a computer device having hardware including at least one processor that is communicatively connected to non-transitory memory, the computer device being configured to be communicatively connectable to the sensors to determine a velocity profile and temperature profile of the fluid that will pass through the device based on the data to be received from the sensors, the data to be received from each of the sensors being based on each acoustic signal received by that sensor; and
   a computer program stored in the non-transitory memory configured to be executed by the at least one processor to cause the computer device to:
      determine the velocity profile and the temperature profile to account for traveling paths of the acoustic signals received by the sensors, and
      account for differences between actual travel times of the acoustic signals and expected travel times of the acoustic signals based on theoretical correlations between temperature and speed fluctuations of the fluid flow,
   wherein a change in the travel time is determined by a calculation in which velocity spatial averages for the fluid flow are determined, and in which local fluctuations to the velocity spatial averages as compared to the determined velocity spatial averages are determined, and in which the travel times are determined by subtracting the determined local fluctuations from the velocity spatial averages.

16. The measurement system of claim 15, wherein the velocity spatial averages for the fluid flow will be based on:

$$\frac{L_i}{c_0(t)}\left(1 - \frac{U_0(t)\cos(\varphi_i) + V_0(t)\sin(\varphi_i)}{c_0(t)}\right)$$

where:
   i is an iteration step;
   t is time;
   L is a length of a traveling path for an acoustic signal;
   $c_0$ is spatial average of sonic speed;
   $U_0$ is an average velocity component of the fluid in a direction along a defined x-axis;
   $V_0$ is an average velocity component of the fluid in a direction along a defined y-axis; and
   $\varphi$ is an angle of the sound propagation relative to the defined x-axis; and wherein a determination of local fluctuations to a velocity spatial average will be based on:

$$\frac{1}{c_0^2(t)} \int_{L_i} \left[ \frac{c_0(t)}{2T_0(t)} \Delta T(R, t) + \Delta U(R, t)\cos(\varphi_i) + \Delta V(R, t)\sin(\varphi_i) \right]$$

where:
$T_0$ is a spatial average of temperature;
$\Delta T$ is a local fluctuation of temperature;
$\Delta U$ is a fluctuation of fluid velocity along the defined x-axis;
$\Delta V$ is a fluctuation of fluid velocity along the defined y-axis; and
R is a position in the device through which the fluid passes.

17. A plant, comprising:
a device, the device being one of a combustion device, a boiler, a furnace, a gas turbine, a heat recovery steam generator, or a heat exchanger;
an array of sensors positioned in the device to detect a temperature and velocity of a fluid passing through the device during operation of the device, each of the sensors being configured to emit an acoustic signal at a frequency that differs from a frequency of the acoustic signal to be emitted by the one or more other sensors, each of the sensors also being configured to receive the acoustic signal emitted by at least one of the other one or more sensors;
a computer device having hardware including at least one processor that is communicatively connected to non transitory memory, the computer device being configured to be communicatively connectable to the sensors to determine a velocity profile and temperature profile of a flow of the fluid passing through the device based on the data to be received from the sensors, the data to be received from each of the sensors being based on each acoustic signal received by that sensor; and
wherein the determining of the velocity profile and the temperature profile to be made by the computer device accounts for traveling paths of the acoustic signals received by the sensors and accounts for differences between travel times of the acoustic signals and expected travel times for the acoustic signals based on theoretical correlations between temperature and speed fluctuations of the fluid, changes in the travel times being determined by calculations in which velocity spatial averages for the flow of the fluid are determined by the computer device, and in which local fluctuations to the velocity spatial averages as compared to the determined velocity spatial averages are determined by the computer device, and in which the travel times for the acoustic signals are determined by subtracting the determined local fluctuations from the velocity spatial averages;
the velocity spatial averages for the flow of fluid being determined based on:

$$\frac{L_i}{c_0(t)}\left(1 - \frac{U_0(t)\cos(\varphi_i) + V_0(t)\sin(\varphi_i)}{c_0(t)}\right)$$

where:
i is an iteration step;
t is time;
L is a length of a traveling path for an acoustic signal;
$c_0$ is spatial average of sonic speed;
$U_0$ is an average velocity component of the fluid in a direction along a defined x-axis;
$V_0$ is an average velocity component of the fluid in a direction along a defined y-axis; and
$\varphi$ is an angle of the sound propagation relative to the defined x-axis; and
the determination of local fluctuations to the velocity spatial averages being based on:

$$\frac{1}{c_0^2(t)} \int_{L_i} \left[ \frac{c_0(t)}{2T_0(t)} \Delta T(R, t) + \Delta U(R, t)\cos(\varphi_i) + \Delta V(R, t)\sin(\varphi_i) \right]$$

where:
$T_0$ is a spatial average of temperature;
$\Delta T$ is a local fluctuation of temperature;
$\Delta U$ is a fluctuation of fluid velocity along the defined x-axis;
$\Delta V$ is a fluctuation of fluid velocity along the defined y-axis; and
R is a position in the device through which the fluid passes.

* * * * *